United States Patent Office 2,742,481
Patented Apr. 17, 1956

2,742,481

DIALKYLAMINOIMIDAZOLINE COMPOUNDS AND THEIR PREPARATION

Cornelius K. Cain, Flourtown, Pa., assignor to McNeil Laboratories, Inc., Philadelphia, Pa., a corporation of Pennsylvania No Drawing. Application October 20, 1953, Serial No. 387,305

3 Claims. (Cl. 260—309.6)

The present invention relates to novel chemical compounds and to the method of preparing the same; and, more particularly, it relates to dialkyl aminoimidazoline compounds possessing hypotensive properties.

Many agents are known to produce a lowering of blood pressure in a living body. Unfortunately, these substances possess such limitations and disadvantages as to render them practically unusable as specific therapeutic agents in the treatment and relief of hypertension. Thus, in many cases the hypotensive effect of these agents is only transitory, while others produce undesirable side effects on the system even at levels that are only partially effective hypotensively. Many of the agents cannot be administered orally since they have an irritating or corrosive effect on the stomach or intestinal wall, and even when administered parenterally, the results as far as relief from hypertension is concerned are erratic.

It is the principal object of the present invention to provide new chemical compounds that possess valuable hypotensive properties and which do not produce undesirable effects on the system.

Another object of the invention is to provide new chemical compounds having the described properties which may be administered orally as well as parenterally.

Other objects including the provision of a method of making the novel compounds will become apparent from a consideration of the following specification and the claims.

The novel compounds of the present invention are diethylaminoimidazoline compounds comprising the following fundamental structural formula:

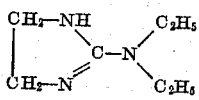

In the compounds of the invention one equivalent of acid may be added to the molecule to form a salt. Hence, the compounds of the invention may be prepared and/or employed either as the base or as a salt. In view of the fact that the salts differ from the bases only in the addition of the acid to the molecule and are characterized by the same fundamental structural formula, the salts as well as the bases are included within the scope of this application and of the claims where reference is made to a compound comprising the stated fundamental structure.

The acid forming the salt may be any inorganic or organic acid desired, for example, hydrochloric, hydrobromic, hydriodic, nitric, sulphuric, phosphoric, and the like; acetic, propionic, caproic, stearic, and other acids of this series, and the like; crotonic, fumaric, oleic, oxalic, citric, tartaric, lactic, benzoic, naphthoic, picric, salicylic, dilituric, methane sulphonic, camphor sulphonic, and the like. If a salt is to be administered, any toxicity or other undesirable properties which may be imparted by the acid should be taken into consideration as well known in the art.

The compounds of the invention are readily prepared by reacting one mol of a 2-alkylmercaptoimidazoline or a salt thereof,

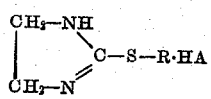

where R is an alkyl group and HA represents an acid added to the molecule to provide a salt, and one mol of diethylamine. Advantageously the amine is present in some excess over that stoichiometrically required. Lead oxide may be employed during the reaction to avoid liberation of gaseous mercaptan. The reaction is conducted in a suitable solvent such as water, acetone or methanol, the latter being preferred, and at an elevated temperature, preferably under refluxing.

Upon the completion of the reaction, and after the removal of the lead mercaptide when lead oxide is employed, the product is separated from the reaction medium as by evaporation of the solvent. The resulting product may then be purified following well known techniques, such as by recrystallization from, for example, isopropyl alcohol.

When a salt is prepared, the product prepared as described above, either before or after purification, is treated, usually in solution, with the desired acid. The resulting salt may then be recovered by conventional extraction procedures, and purified as by recrystallization from, for example, isopropyl alcohol.

The compounds of the present invention and their preparation are further illustrated by the following specific examples which are given for the purpose of illustration only:

*Example I*

A mixture of 24 g. (0.1 mol) of 2-methylmercaptoimidazoline hydriodide, 15 g. (0.2 mol) of diethylamine and 50 cc. of methanol is refluxed for 16 hours. The solvent is removed by distillation under reduced pressure and the oily residue dissolved in water, made basic with sodium hydroxide and extracted with methylene chloride. Evaporation of the methylene chloride solution gives a residue comprising essentially 2-diethylaminoimidazoline.

*Example II*

The product of Example I is dissolved in methanol and treated with 8 g. of fumaric acid. The resulting solution is treated with ether to precipitate 2-diethylaminoimidazoline fumarate as a solid. Recrystallization from isopropyl alcohol gives with crystals melting at 160–162.5° C.

Analysis.—Calculated for $C_{11}H_{19}N_3O_4$: C, 51.2; H, 7.4; N, 16.3. Found: C, 51.2; H, 7.6; N, 16.4.

Tests showed that about 1 mg. of this compound per kilogram of body weight lowered the blood pressure markedly for a substantial period of time.

I claim:

1. Diethylaminoimidazoline compounds selected from the group consisting of 2-diethylaminoimidazoline and its non-toxic acid addition salts.

2. A non-toxic acid addition salt of 2-diethylaminoimidazoline.

3. Diethylaminoimidazoline fumarate.

References Cited in the file of this patent

UNITED STATES PATENTS

| | | |
|---|---|---|
| 1,912,849 | Kranzlein et al. | June 6, 1933 |
| 2,586,844 | McKay et al. | Feb. 26, 1952 |